United States Patent [19]
Graves et al.

[11] Patent Number: 5,822,448
[45] Date of Patent: *Oct. 13, 1998

[54] METHOD AND APPARATUS FOR CURRENCY DISCRIMINATION

[75] Inventors: Bradford T. Graves, Arlington Heights; Douglas U. Mennie, Barrington, both of Ill.

[73] Assignee: Cummins-Allison Corp., Mt. Prospect, Ill.

[*] Notice: The term of this patent shall not extend beyond the expiration date of Pat. No. 5,467,405.

[21] Appl. No.: 716,556

[22] Filed: Sep. 18, 1996

Related U.S. Application Data

[63] Continuation of Ser. No. 243,807, May 16, 1994, Pat. No. 5,633,949, which is a continuation-in-part of Ser. No. 219,093, Mar. 29, 1994, abandoned, and Ser. No. 127,334, Sep. 27, 1993, Pat. No. 5,467,405, which is a continuation of Ser. No. 885,648, May 19, 1992, Pat. No. 5,295,196, which is a continuation-in-part of Ser. No. 475,111, Feb. 5, 1990, abandoned, said Ser. No. 219,093, is a continuation-in-part of Ser. No. 127,334.

[51] Int. Cl.$^6$ .................................................. G06K 9/00
[52] U.S. Cl. ........................... 382/135; 382/320; 382/321
[58] Field of Search ...................... 382/135, 160, 382/207, 318, 319, 320, 321, 322, 323; 250/556; 356/71; 209/534; 235/379

[56] References Cited

U.S. PATENT DOCUMENTS

| | | | |
|---|---|---|---|
| D. 369,984 | 5/1996 | Larsen ........................ D10/97 |
| 3,246,295 | 4/1966 | DeClaris et al. .................... 382/56 |
| 3,280,974 | 10/1966 | Riddle et al. ...................... 209/111.8 |
| 3,480,785 | 11/1969 | Aufderheide ...................... 250/219 |
| 3,496,370 | 2/1970 | Haville et al. ..................... 250/219 |
| 3,509,535 | 4/1970 | Berube ............................. 340/149 |
| 3,612,835 | 10/1971 | Andrews et al. ............. 235/61.11 D |
| 3,679,314 | 7/1972 | Mustert ............................ 356/71 |
| 3,778,628 | 12/1973 | Novak et al. ..................... 250/556 |
| 3,870,629 | 3/1975 | Carter et al. ..................... 209/111.8 |
| 3,906,449 | 9/1975 | Marchak .......................... 340/149 R |
| 3,976,198 | 8/1976 | Carnes et al. ..................... 209/111.7 T |
| 4,041,456 | 8/1977 | Ott et al. ........................... 382/135 |
| 4,096,991 | 6/1978 | Iguchi ............................... 235/419 |
| 4,114,804 | 9/1978 | Jones et al. ....................... 235/476 |

(List continued on next page.)

FOREIGN PATENT DOCUMENTS

| | | |
|---|---|---|
| A0077464 | 4/1983 | European Pat. Off. . |
| A0338123 | 10/1989 | European Pat. Off. . |
| A0342647 | 11/1989 | European Pat. Off. . |
| WO 90 07165 | 6/1990 | WIPO . |
| WO 91/11778 | 8/1991 | WIPO . |
| WO 92/17394 | 10/1992 | WIPO . |
| WO 93/23824 | 11/1993 | WIPO . |
| WO94/19773 | 9/1994 | WIPO . |
| WO 95/24691 | 9/1995 | WIPO . |
| WO 96/10800 | 4/1996 | WIPO . |

OTHER PUBLICATIONS

Mosler Inc. brochure "The Mosler/Toshiba CF–420", 1989.
AFB Currency Recognition System (no date).

*Primary Examiner*—Phuoc Tran
*Attorney, Agent, or Firm*—Arnold, White & Durkee

[57] ABSTRACT

An improved method of generating a master pattern corresponding to given denomination for use in a discrimination system capable of discriminating among currency bills of different denominations. The master pattern is stored in a memory for subsequent comparison to a pattern generated from a bill under test. The method comprises the steps of generating a plurality of component patterns for a given denomination by scanning a genuine bill of the given denomination and generating a master pattern for the given denomination. The master pattern is derived from an average of the component patterns. The component patterns represent and approximate analog amplitude variations in characteristic information detected from a genuine bill during scanning. Each of the component patterns comprises a plurality of sample values. Each sample value is proportional to the detected characteristic information.

49 Claims, 8 Drawing Sheets

U.S. PATENT DOCUMENTS

| | | | |
|---|---|---|---|
| 4,147,430 | 4/1979 | Gorgone et al. | 356/51 |
| 4,179,685 | 12/1979 | O'Maley | 382/135 |
| 4,250,806 | 2/1981 | Boyson et al. | 101/2 |
| 4,255,651 | 3/1981 | Phillips | 235/92 |
| 4,283,708 | 8/1981 | Lee | 340/146.3 Z |
| 4,288,781 | 9/1981 | Sellner et al. | 340/146.3 Q |
| 4,302,781 | 11/1981 | Ikeda et al. | 358/486 |
| 4,311,914 | 1/1982 | Huber | 250/556 |
| 4,334,619 | 6/1982 | Horino et al. | 209/551 |
| 4,348,656 | 9/1982 | Gorgone et al. | 340/146.3 R |
| 4,349,111 | 9/1982 | Shah et al. | 209/534 |
| 4,355,300 | 10/1982 | Weber | 340/146.3 C |
| 4,356,473 | 10/1982 | Freudenthal | 340/146.3 H |
| 4,381,447 | 4/1983 | Horvath et al. | 250/223 |
| 4,386,432 | 5/1983 | Nakamura et al. . | |
| 4,442,541 | 4/1984 | Finkel et al. | 382/7 |
| 4,461,028 | 7/1984 | Okubo | 382/15 |
| 4,464,786 | 8/1984 | Nishito et al. | 382/7 |
| 4,464,787 | 8/1984 | Fish et al. | 382/7 |
| 4,490,846 | 12/1984 | Ishida et al. | 382/7 |
| 4,513,439 | 4/1985 | Gorgone et al. | 382/7 |
| 4,539,702 | 9/1985 | Oka | 382/7 |
| 4,556,140 | 12/1985 | Okada | 194/4 |
| 4,563,771 | 1/1986 | Gorgone et al. | 382/7 |
| 4,587,412 | 5/1986 | Apisdorf | 235/449 |
| 4,587,434 | 5/1986 | Roes et al. | 250/556 |
| 4,592,090 | 5/1986 | Curl et al. | 382/7 |
| 4,628,194 | 12/1986 | Dobbins et al. | 235/379 |
| 4,645,936 | 2/1987 | Gorgone | 250/556 |
| 4,653,647 | 3/1987 | Hashimoto . | |
| 4,677,682 | 6/1987 | Miyagawa et al. | 382/7 |
| 4,700,368 | 10/1987 | Munn et al. | 377/8 |
| 4,733,308 | 3/1988 | Nakamura et al. | 358/496 |
| 4,823,393 | 4/1989 | Kawakami | 382/7 |
| 4,881,268 | 11/1989 | Uchida et al. | 382/7 |
| 4,973,851 | 11/1990 | Lee | 250/556 |
| 4,992,860 | 2/1991 | Hamaguchi et al. | 358/75 |
| 4,996,604 | 2/1991 | Ogawa et al. | 358/486 |
| 5,047,871 | 9/1991 | Meyer et al. | 358/486 |
| 5,068,519 | 11/1991 | Bryce . | |
| 5,122,754 | 6/1992 | Gotaas | 324/676 |
| 5,163,672 | 11/1992 | Mennie | 271/187 |
| 5,167,313 | 12/1992 | Dobbins et al. | 194/317 |
| 5,201,395 | 4/1993 | Takizawa et al. | 194/206 |
| 5,207,788 | 5/1993 | Geib et al. | 271/122 |
| 5,261,518 | 11/1993 | Bryce | 194/206 |
| 5,295,196 | 3/1994 | Raterman et al. | 382/135 |
| 5,341,408 | 8/1994 | Melcher et al. | 377/8 |
| 5,430,664 | 7/1995 | Cargill et al. | 364/550 |
| 5,437,357 | 8/1995 | Ota et al. | 382/135 |
| 5,467,405 | 11/1995 | Raterman et al. | 382/135 |
| 5,467,406 | 11/1995 | Graves et al. | 382/135 |
| 5,633,949 | 5/1997 | Graves et al. | 382/135 |

METHOD AND APPARATUS FOR CURRENCY DISCRIMINATION

BACKGROUND OF THE INVENTION

Cross-Reference to

The application is a continuation of application Ser. No. 08/243,807, filed May 16, 1994, now U.S. Pat. No. 5,633,949. Application Ser. No. 08/243,807 is a continuation-in-part of U.S. patent application Ser. No. 08/127,334 filed Sep. 27, 1993, for a "Method and Apparatus for Currency Discrimination and Counting," now issued as U.S. Pat. No. 5,467,405 and a continuation-in-part of U.S. patent application Ser. No. 08/219,093 filed Mar. 29, 1994, for a "Currency Discriminator and Authenticator," now abandoned. U.S. patent application Ser. No. 08/127,334 is continuation of U.S. patent application Ser. No. 07/885,648, filed on May 19, 1992, and issued as U.S. Pat. No. 5,9295,196, for a "Method and Apparatus for Currency Discrimination and Counting," which is a continuation-in-part of abandoned U.S. patent application Ser. No. 07/475,111, filed Feb. 5, 1990, for a "Method and Apparatus for Currency Discrimination and Counting." U.S. patent application Ser. No. 08/219,093 is a continuation-in-part of U.S. patent application Ser. No. 08/127,334 filed Sep. 27, 1993, for a "Method and Apparatus for Currency Discrimination and Counting", which is a continuation of U.S. patent application Ser. No. 07/885,648, filed on May 19, 1992, and issued as U.S. Pat. No. 5,295,196, for a "Method and Apparatus for Currency Discrimination and Counting," which is a continuation-in-part of abandoned U.S. patent application Ser. No. 07/475,111, filed Feb. 5, 1990, for a "Method and Apparatus for Currency Discrimination and Counting."

FIELD OF THE INVENTION

The present invention relates, in general, to currency identification. More specifically, the present invention relates to an apparatus and method for discriminating currency bills of different denominations.

BACKGROUND

A variety of techniques and apparatus have been used to satisfy the requirements of automated currency handling systems. At the lower end of sophistication in this area of technology are systems capable of handling only a specific type of currency, such as a specific dollar denomination, while rejecting all other currency types. At the upper end are complex systems which are capable of identifying and discriminating among and automatically counting multiple currency denominations.

Currency discrimination systems typically employ either magnetic sensing or optical sensing for discriminating among different currency denominations. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for currency discrimination. A variety of currency characteristics can be measured using magnetic sensing. These include detection of patterns of changes in magnetic flux, patterns of vertical grid lines in the portrait area of bills, the presence of a security thread, total amount of magnetizable material of a bill, patterns from sensing the strength of magnetic fields along a bill, and other patterns and counts from scanning different portions of the bill such as the area in which the denomination is written out.

The more commonly used optical sensing techniques, on the other hand, are based on detecting and analyzing variations in light reflectance or transmissivity characteristics occurring when a currency bill is illuminated and scanned by a strip of focused light. The subsequent currency discrimination is based on the comparison of sensed optical characteristics with prestored parameters for different currency denominations, while accounting for adequate tolerances reflecting differences among individual bills of a given denomination. A variety of currency characteristics can be measured using optical sensing. These include detection of a bill's density, color, length and thickness, the presence of a security thread and holes, and other patterns of reflectance and transmission. Color detection techniques may employ color filters, colored lamps, and/or dichroic beamsplitters.

In addition to magnetic and optical sensing, other techniques of detecting characteristic information of currency include electrical conductivity sensing, capacitive sensing (such as for watermarks, security threads, thickness, and various dielectric properties) and mechanical sensing (such as for limpness and thickness).

A major obstacle in implementing automated currency discrimination systems is obtaining an optimum compromise between the criteria used to adequately define the characteristic pattern for a particular currency denomination, the time required to analyze test data and compare it to predefined parameters in order to identify the currency bill under scrutiny, and the rate at which successive currency bills may be mechanically fed through and scanned. Even with the use of microprocessors for processing the test data resulting from the scanning of a bill, a finite amount of time is required for acquiring samples and for the process of comparing the test data to stored parameters to identify the denomination of the bill.

Recent currency discriminating systems rely on comparisons between a scanned pattern obtained from a subject bill and sets of stored master patterns for the various denominations among which the system is designed to discriminate. As a result, the master patterns which are stored play an important role in a discrimination system's ability to discriminate among bills of various denominations as well as between genuine bills and counterfeit bills. These master patterns have been generated by scanning bills of various denominations known to be genuine and storing the resulting patterns. However, a pattern generated by scanning a genuine bill of a given denomination can vary depending upon a number of factors such as the condition of the bill, e.g., whether it is a crisp bill in new condition or a worn, flimsy bill, as well as year in which the bill was printed, e.g., before or after security threads were incorporated into bills of some denominations. Likewise, it has been found that bills which have experienced a high degree of usage may shrink, resulting in a reduction of the dimensions of such bills. Such shrinkage may likewise result in variations in scanning patterns. As a result, if, for example, a $20 master pattern is generated by scanning a crisp, genuine $20 bill, the discrimination system may reject an unacceptable number of genuine but worn $20 bills. Likewise, if a $20 master pattern is generated using a very worn, genuine $20 bill, the discrimination system may reject an unacceptable number of genuine but crisp $20 bills.

SUMMARY OF THE INVENTION

It is a principal object of the present invention to provide an improved method and apparatus for discriminating among currency bills comprising a plurality of currency denominations.

It is another object of this invention to provide an improved method and apparatus of the above kind which is capable of efficiently discriminating among bills of several currency denominations at a high speed and with a high degree of accuracy.

Briefly, in accordance with the present invention, the objectives enumerated above are achieved by generating a master pattern for a given denomination by averaging a plurality of component patterns, typically three, each generated by scanning a genuine bill of the given denomination.

According to one method, a master pattern for a given denomination is generated by averaging a plurality of component patterns, wherein the component patterns are generated by scanning one or more genuine bills of "standard" or average quality of the given denomination. A "standard" bill is a slightly used bill, as opposed to a crisp new bill or one which has been subject to a high degree of usage.

According to another method, a master pattern for a given denomination is generated by averaging a plurality of component patterns, wherein some of the component patterns are generated by scanning one or more new bills of the given denomination and some of the component patterns are generated by scanning one or more old bills of the given denomination.

BRIEF DESCRIPTION OF THE DRAWINGS

Other objects and advantages of the invention will become apparent upon reading the following detailed description in conjunction with the drawings in which.

DETAILED DESCRIPTION OF THE PREFERRED EMBODIMIENTS

Figure 1:
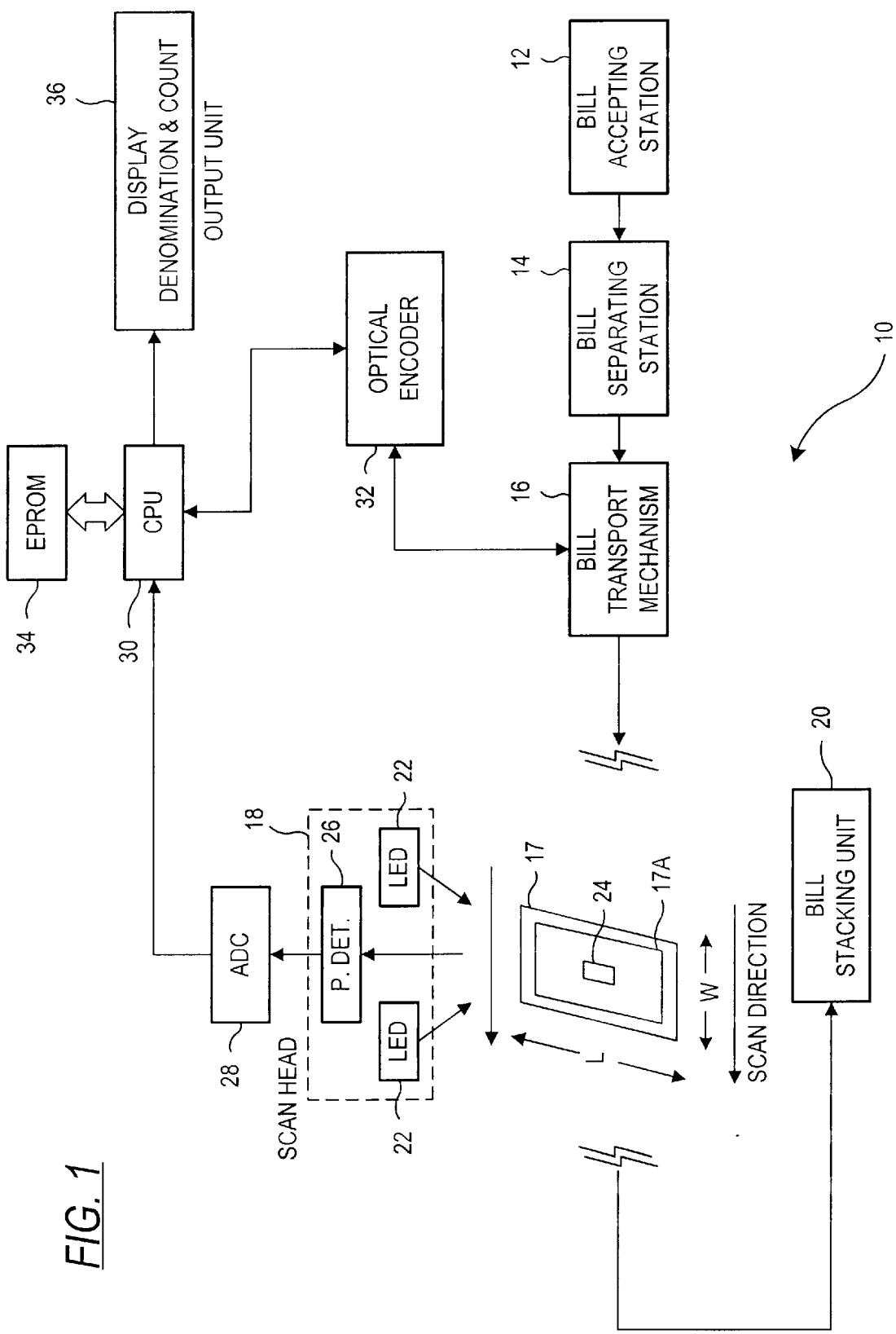
FIG. 1 is a functional block diagram illustrating a preferred embodiment of a currency discriminating system according to the present invention.

Referring now to FIG. 1, there is shown a functional block diagram illustrating a preferred embodiment of a currency discriminating system according to the present invention.

The system 10 includes a bill accepting station 12 where stacks of currency bills that need to be identified and counted are positioned. Accepted bills are acted upon by a bill separating station 14 which functions to pick out or separate one bill at a time for being sequentially relayed by a bill transport mechanism 16, according to a precisely predetermined transport path, across scanhead 18 where the currency denomination of the bill is scanned and identified. In the preferred embodiment depicted, scanhead 18 is an optical scanhead that scans for characteristic information from a scanned bill 17 which is used to identify the denomination of the bill. The scanned bill 17 is then transported to a bill stacking station 20 where bills so processed are stacked for subsequent removal.

The optical scanhead 18 of the preferred embodiment depicted in FIG. 1 comprises at least one light source 22 directing a beam of coherent light downwardly onto the bill transport path so as to illuminate a substantially rectangular light strip 24 upon a currency bill 17 positioned on the transport path below the scanhead 18. Light reflected off the illuminated strip 24 is sensed by a photodetector 26 positioned directly above the strip. The analog output of photodetector 26 is converted into a digital signal by means of an analog-to-digital (ADC) convertor unit 28 whose output is fed as a digital input to a central processing unit (CPU) 30.

While scanhead 18 in the preferred embodiment of FIG. 1 is an optical scanhead, it should be understood that it may be designed to detect a variety of characteristic information from currency bills. Additionally, the scanhead may employ a variety of detection means such as magnetic, optical, electrical conductivity, and capacitive sensors. Use of such sensors is discussed in more detail U.S. patent application Ser. No. 08/219,093 filed on Mar. 28, 1994 for a "Currency Discriminator and Authenticator" and incorporated herein by reference.

Referring again to the preferred embodiment depicted in FIG. 1, the bill transport path is defined in such a way that the transport mechanism 16 moves currency bills with the narrow dimension of the bills being parallel to the transport path and the scan direction. Alternatively, the system 10 may be designed to scan bills along their long dimension or along a skewed dimension. As a bill 17 moves on the transport path on the scanhead 18, the coherent light strip 24 effectively scans the bill across the narrow dimension of the bill. In the preferred embodiment depicted, the transport path is so arranged that a currency bill 17 is scanned by scanhead 18 approximately about the central section of the bill along its narrow dimension, as shown in FIG. 1. The scanhead 18 functions to detect light reflected from the bill as it moves across the illuminated light strip 24 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system of this invention is programmed to handle.

A series of such detected reflectance signals are obtained across the narrow dimension of the bill, or across a selected segment thereof, and the resulting analog signals are digitized under control of the CPU 30 to yield a fixed number of digital reflectance data samples. The data samples are then subjected to a digitizing process which includes a normalizing routine for processing the sampled data for improved correlation and for smoothing out variations due to "contrast" fluctuations in the printed pattern existing on the bill surface. The normalized reflectance data so digitized represents a characteristic pattern that is fairly unique for a given bill denomination and provides sufficient distinguishing features among characteristic patterns for different currency denominations. This process is more fully explained in U.S. patent application Ser. No. 071/885,648, filed on May 19, 1992, now issued as U.S. Pat. No. 5,295,196 for a "Method and Apparatus for Currency Discrimination and Counting," which is incorporated herein by reference in its entirety.

In order to ensure strict correspondence between reflectance samples obtained by narrow dimension scanning of successive bills, the initiation of the reflectance sampling process is preferably controlled through the CPU 30 by means of an optical encoder 32 which is linked to the bill transport mechanism 16 and precisely tracks the physical movement of the bill 17 across the scanhead 18. More specifically, the optical encoder 32 is linked to the rotary motion of the drive motor which generates the movement imparted to the bill as it is relayed along the transport path. In addition, the mechanics of the feed mechanism (not shown, see U.S. Pat. No. 5,295,196 referred to above) ensure that positive contact is maintained between the bill and the transport path, particularly when the bill is being scanned by scanhead 18. Under these conditions, the optical encoder 32 is capable of precisely tracking the movement of the bill 17 relative to the light strip 24 generated by the scanhead 18 by monitoring the rotary motion of the drive motor.

The output of photodetector 26 is monitored by the CPU 30 to initially detect the presence of the bill underneath the scanhead 18 and, subsequently, to detect the starting point of the printed pattern on the bill, as represented by the thin borderline 17A which typically encloses the printed indicia on currency bills. Once the borderline 17A has been detected, the optical encoder 32 is used to control the timing and number of reflectance samples that are obtained from the output of the photodetector 26 as the bill 17 moves across the scanhead 18 and is scanned along its narrow dimension.

The detection of the borderline 17A constitutes an important step and realizes improved discrimination efficiency since the borderline 17A serves as an absolute reference point for initiation of sampling. If the edge of a bill were to be used as a reference point, relative displacement of sampling points can occur because of the random manner in which the distance from the edge to the borderline 17A varies from bill to bill due to the relatively large range of tolerances permitted during printing and cutting of currency bills. As a result, it becomes difficult to establish direct correspondence between sample points in successive bill scans and the discrimination efficiency is adversely affected.

The use of the optical encoder 32 for controlling the sampling process relative to the physical movement of a bill 17 across the scanhead 18 is also advantageous in that the encoder 32 can be used to provide a predetermined delay following detection of the borderline prior to initiation of samples. The encoder delay can be adjusted in such a way that the bill 17 is scanned only across those segments along its narrow dimension which contain the most distinguishable printed indicia relative to the different currency denominations.

In the case of U.S. currency, for instance, it has been determined that the central, approximately two-inch portion of currency bills, as scanned across the central section of the narrow dimension of the bill, provides sufficient data for distinguishing among the various U.S. currency denominations on the basis of the correlation technique disclosed in U.S. Pat. No. 5,295,196 referred to above. Accordingly, the optical encoder can be used to control the scanning process so that reflectance samples are taken for a set period of time and only after a certain period of time has elapsed since the borderline 17A has been detected, thereby restricting the scanning to the desired central portion of the narrow dimension of the bill.

Figure 2A:
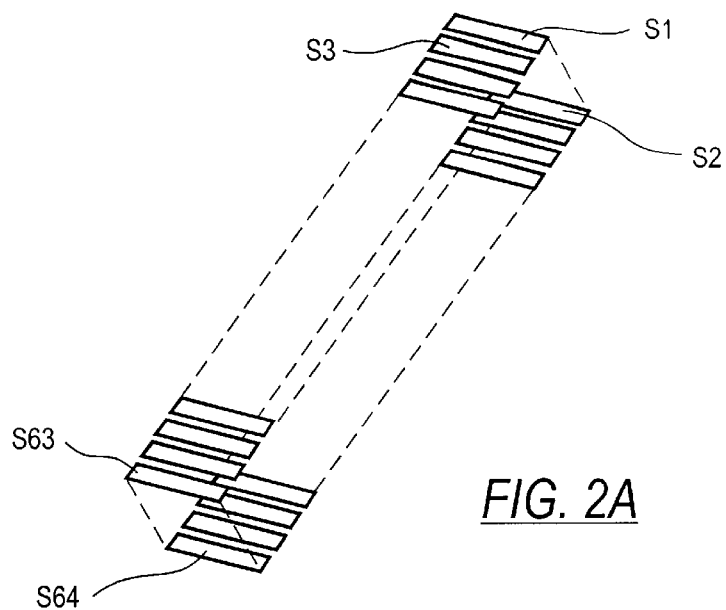
FIG. 2A is a diagrammatic perspective illustration of the successive areas scanned during the traversing movement of a single bill across an optical sensor according to a preferred embodiment of the present invention.
Figure 2B:
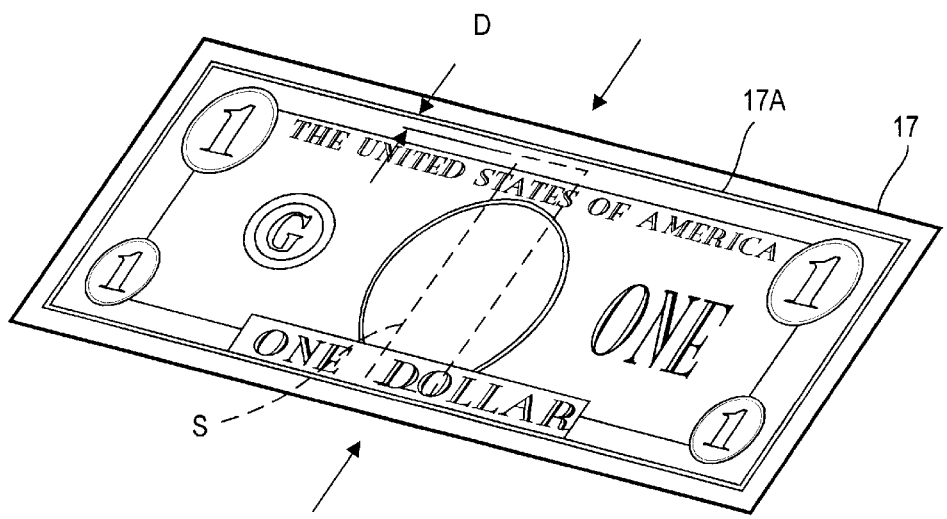
FIG. 2B is a perspective view of a bill and a preferred area to be optically scanned on the bill.
Figure 2C:
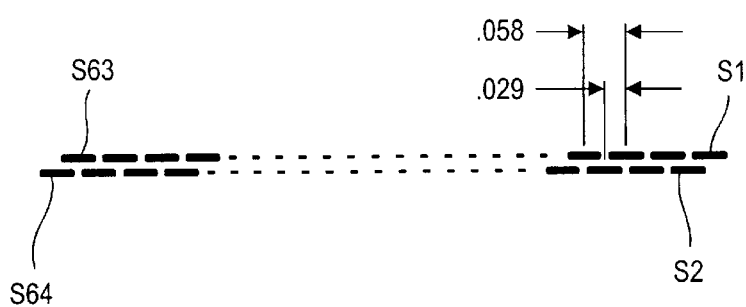
FIG. 2C is a diagrammatic side elevation view of the scan area to be optically scanned on a bill according to a preferred embodiment of the present invention.

FIGS. 2A–2C illustrate the scanning process of scanhead 20 in more detail. Referring to FIG. 2B, as a bill 17 is advanced in a direction parallel to the narrow edges of the bill, scanning via a wide slit in the scanhead 18 is effected along a segment S of the central portion of the bill 17. This segment S begins a fixed distance d inboard of the borderline 17A. As the bill 17 traverses the scanhead 18, a strip s of the segment S is always illuminated, and the photodetector 26 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead 18.

As illustrated in FIGS. 2A and 2C, it is preferred that the sampling intervals be selected so that the strips s that are illuminated for successive samples overlap one another. The odd-numbered and even-numbered sample strips have been separated in FIGS. 2A and 2C to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch wide at 0.029 inch intervals, along a segment S that is 1.83 inch long (64 samples).

The optical sensing and correlation technique is based upon using the above process to generate a series of stored intensity signal patterns using genuine bills for each denomination of currency that is to be detected. According to a preferred embodiment, two or four sets of master intensity signal samples are generated and stored within system memory, preferably in the form of an EPROM 34 (see FIG. 1), for each detectable currency denomination. The sets of master intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of foreign bills. Additionally, the optical scanning may be performed on both sides of a bill, for example, by placing a scanhead on each side of the bill transport path as described in more detail in co-pending U.S. patent application Ser. No. 08/207,592 filed Mar. 8, 1994, for a "Method and Apparatus for Currency Discrimination."

In adapting this technique to U.S. currency, for example, sets of stored intensity signal samples are generated and stored for seven different denominations of U.S. currency, i.e., $1, $2, $5, $10, $20, $50 and $100. For bills which produce significant pattern changes when shifted slightly to the left or right, such as the $2 and the $10 bill in U.S. currency, it is preferred to store two patterns for each of the "forward" and "reverse" directions, each pair of patterns for the same direction represent two scan areas that are slightly displaced from each other along the long dimension of the bill. Accordingly, a set of 18 different master characteristic patterns is stored within the system memory for subsequent correlation purposes (four master patterns for the $2 and the $10 bill and two master patterns for each of the other denominations. The generation of the master patterns will be discussed in more detail below. Once the master patterns have been stored, the pattern generated by scanning a bill under test is compared by the CPU 30 with each of the 18 master patterns of store d intensity signal samples to generate, for each comparison, a correlation number representing the extent of correlation, i.e., similarity between corresponding ones of the plurality of data samples, for the sets of data being compared.

The CPU 30 is programmed to identify the denomination of the scanned bill as corresponding to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. Such a method is disclosed in U.S. Pat. No. 5,295,196 referred to above. If a "positive" call can not be made for a scanned bill, an error signal is generated.

Using the above sensing and correlation approach, the CPU 30 is programmed to count the number of bills belonging to a particular currency denomination as part of a given set of bills that have been scanned for a given scan batch, and to determine the aggregate total of the currency amount represented by the bills scanned during a scan batch. The CPU 30 is also linked to an output unit 36 which is adapted to provide a display of the number of bills counted, the breakdown of the bills in terms of currency denomination, and the aggregate total of the currency value represented by counted bills. The output unit 36 can also be adapted to provide a print-out of the displayed information in a desired format.

Figure 3A:
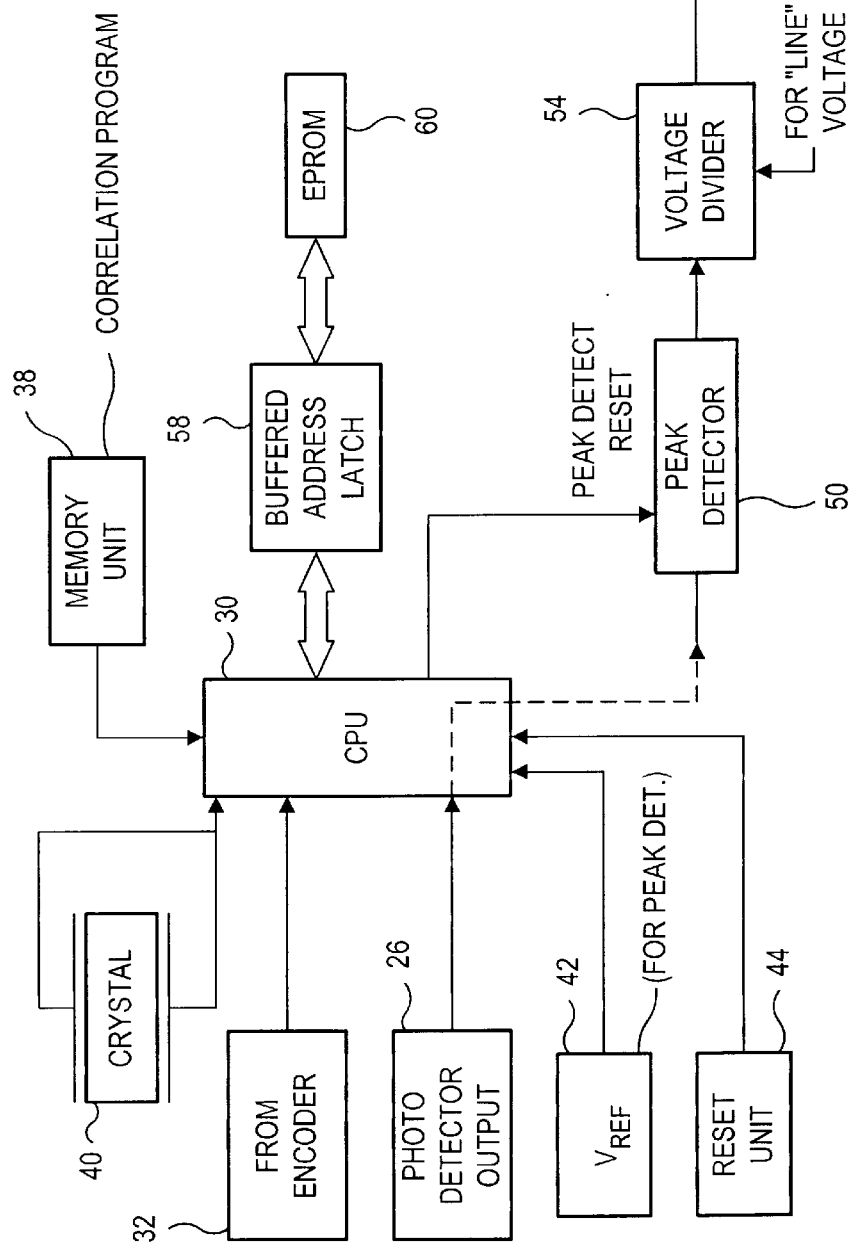
FIG. 3A is a block diagram illustrating a preferred circuit arrangement for processing and correlating reflectance data according to the optical sensing and counting technique of this invention.

Referring now to FIG. 3A, there is shown a representation, in block diagram form, of a preferred circuit arrangement for processing and correlating reflectance data according to the system of this invention. As shown therein, the CPU 30 accepts and processes a variety of input signals including those from the optical encoder 32, the photodetector 26 and a memory unit 38, which can be an erasable programmable read only memory (EPROM). The memory unit 38 has stored within it the correlation program on the basis of which patterns are generated and test patterns compared with stored master programs in order to identify the denomination of test currency. A crystal 40 serves as the time base for the CPU 30, which is also provided with an external reference voltage VREF on the basis of which peak detection of sensed reflectance data is performed, as explained in detail below.

Figure 3B:
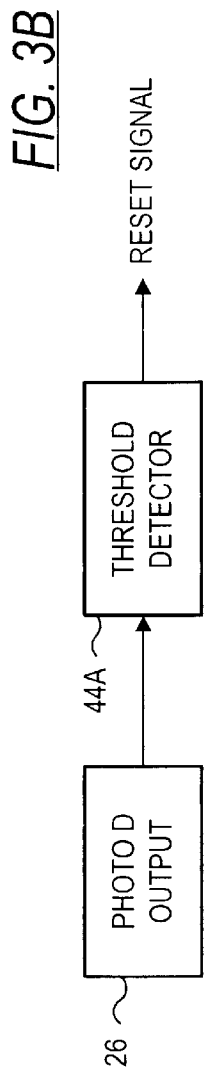
FIG. 3B is a block diagram illustrating a circuit arrangement for producing a reset signal.

The CPU 30 also accepts a timer reset signal from a reset unit 44 which, as shown in FIG. 3B, accepts the output voltage from the photodetector 26 and compares it, by means of a threshold detector 44A, relative to a pre-set voltage threshold, typically 5.0 volts, to provide a reset signal which goes "high" when a reflectance value corresponding to the presence of paper is sensed. More specifically, reflectance sampling is based on the premise that no portion of the illuminated light strip (24 in FIG. 1) is reflected to the photodetector in the absence of a bill positioned below the scanhead. Under these conditions, the output of the photodetector represents a "dark" or "zero" level reading. The photodetector output changes to a "white" reading, typically set to have a value of about 5.0 volts, when the edge of a bill first becomes positioned below the scanhead and falls under the light strip 24. When this occurs, the reset unit 44 provides a "high" signal to the CPU 30 and marks the initiation of the scanning procedure.

In accordance with a feature of this invention, the machine-direction dimension of the illuminated strip of light produced by the light sources within the scanhead is set to be relatively small for the initial stage of the scan when the thin borderline is being detected. The use of the narrow slit increases the sensitivity with which the reflected light is detected and allows minute variations in the "gray" level reflected off the bill surface to be sensed. This is important in ensuring that the thin borderline of the pattern, i.e., the starting point of the printed pattern on the bill, is accurately detected. Once the borderline has been detected, subsequent reflectance sampling is performed on the basis of a relatively wider light strip in order to completely scan across the narrow dimension of the bill and obtain the desired number of samples, at a rapid rate. The use of a wider slit for the actual sampling also smooths out the output characteristics of the photodetector and realizes the relatively large magnitude of analog voltage which is essential for accurate representation and processing of the detected reflectance values.

Returning to FIG. 3A the CPU 30 processes the output of photodetector 26 through a peak detector 50 which essentially functions to sample the photodetector output voltage and hold the highest, i.e., peak, voltage value encountered after the detector has been enabled. The peak detector is also adapted to define a scaled voltage on the basis of which the pattern borderline on bills is detected. The output of the peak detector 50 is fed to a voltage divider 54 which lowers the peak voltage down to a scaled voltage $V_s$ representing a predefined percentage of this peak value. The voltage $V_s$ is based upon the percentage drop in output voltage of the peak detector as it reflects the transition from the "high" reflectance value resulting from the scanning of the unprinted edge portions of a currency bill to the relatively lower "gray" reflectance value resulting when the thin borderline is encountered. Preferably, the scaled voltage $V_s$ is set to be about 70–80 percent of the peak voltage.

The scaled voltage $V_s$ is supplied to a line detector 56 which is also provided with the incoming instantaneous output of the photodetector 26. The line detector 56 compares the two voltages at its input side and generates a signal $L_{DET}$ which normally stays "low" and goes "high" when the edge of the bill is scanned. The signal $L_{DET}$ goes "low" when the incoming photodetector output reaches the predefined percentage of the peak photodetector output up to that point, as represented by the voltage $V_s$. Thus, when the signal $L_{DET}$ goes "low", it is an indication that the borderline of the bill pattern has been detected. At this point, the CPU 30 initiates the actual reflectance sampling under control of the encoder 32 (see FIG. 3A) and the desired fixed number of reflectance samples are obtained as the currency bill moves across the illuminated light strip and is scanned along the central section of its narrow dimension.

When master characteristic patterns are being generated, the reflectance samples resulting from the scanning of a standard bill are loaded into corresponding designated sections within a system memory 60, which is preferably an EPROM. The loading of samples is accomplished through a buffered address latch 58, if necessary. During currency discrimination, the reflectance values resulting from the scanning of a test bill are sequentially compared, under control of the correlation program stored within the memory unit 38, with each of the corresponding master characteristic patterns stored within the EPROM 60, again through the address latch 58. The procedure for scanning bills and generating characteristic patterns is described in U.S. Pat. No. 5,295,196 referred to and incorporated by reference in its entirety above.

The optical sensing and correlation technique described in U.S. Pat. No. 5,295,196 permits identification of pre-programmed currency denominations with a high degree of accuracy and is based upon a relatively short processing time for digitizing sampled reflectance values and comparing them to the master characteristic patterns. The approach is used to scan currency bills, normalize the scanned data and generate master patterns in such a way that bill scans during operation have a direct correspondence between compared sample points in portions of the bills which possess the most distinguishable printed indicia. A relatively low number of reflectance samples is required in order to be able to adequately distinguish among several currency denominations.

In currency discrimination systems in which discrimination is based on the comparison of a pattern obtained from scanning a subject bill to stored master patterns corresponding to various denominations, the patterns which are designated as master patterns significantly influence the performance characteristics of a discrimination system. For example, in the system described in U.S. Pat. No. 5,295,196, the correlation procedure and the accuracy with which a denomination is identified directly relates to the degree of correspondence between reflectance samples on the test pattern and corresponding samples on the stored master patterns. In other systems, master patterns have been produced by scanning a genuine bill for a given denomination and storing the resulting pattern as the master pattern for that denomination. However, due to variations among genuine bills, this method is likely to result in poor performance of the discrimination system by rejecting an unacceptable number of genuine bills. It has been found that the relative crispness, age, shrinkage, usage, and other characteristics of a genuine bill can effect the resulting pattern generated by scanning. These factors are often interrelated. For example, it has been found that currency bills which have experienced a high degree of usage exhibit a reduction in both the narrow and wide dimensions of the bills. This shrinkage of "used" bills which, in turn, causes corresponding reductions in their narrow dimensions, can possibly produce a drop in the degree of correlation between such used bills of a given denomination and the corresponding master patterns.

As a result, a discrimination system which generates a master pattern based on a single scan of a genuine bill is not likely to perform satisfactorily. For example, if the $20 master pattern is generated by scanning a crisp, genuine $20 bill, the discrimination system may reject an unacceptable number of genuine but worn $20 bills. Likewise, if the $20 master pattern is generated using a very worn, genuine $20 bill, the discrimination system may reject an unacceptable number of genuine but crisp $20 bills.

According to the present invention, a master pattern for a given denomination is generated by averaging a plurality of component patterns. Each component pattern is generated by scanning a genuine bill of the given denomination.

Figure 4A:
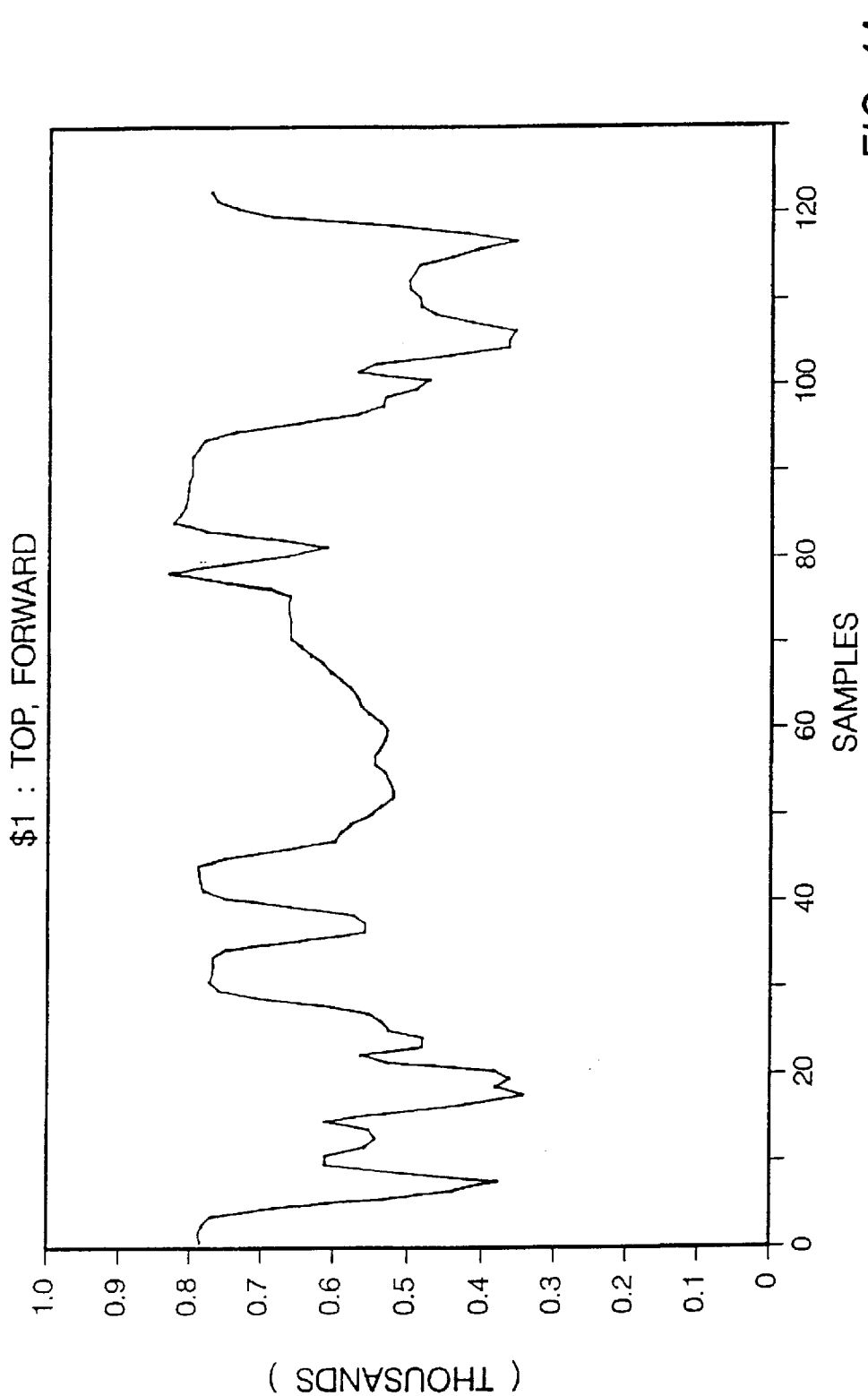
FIGS. 4A–4C are graphs illustrating master patterns generated according to a first method according to a preferred embodiment of the present invention.
Figure 4B:
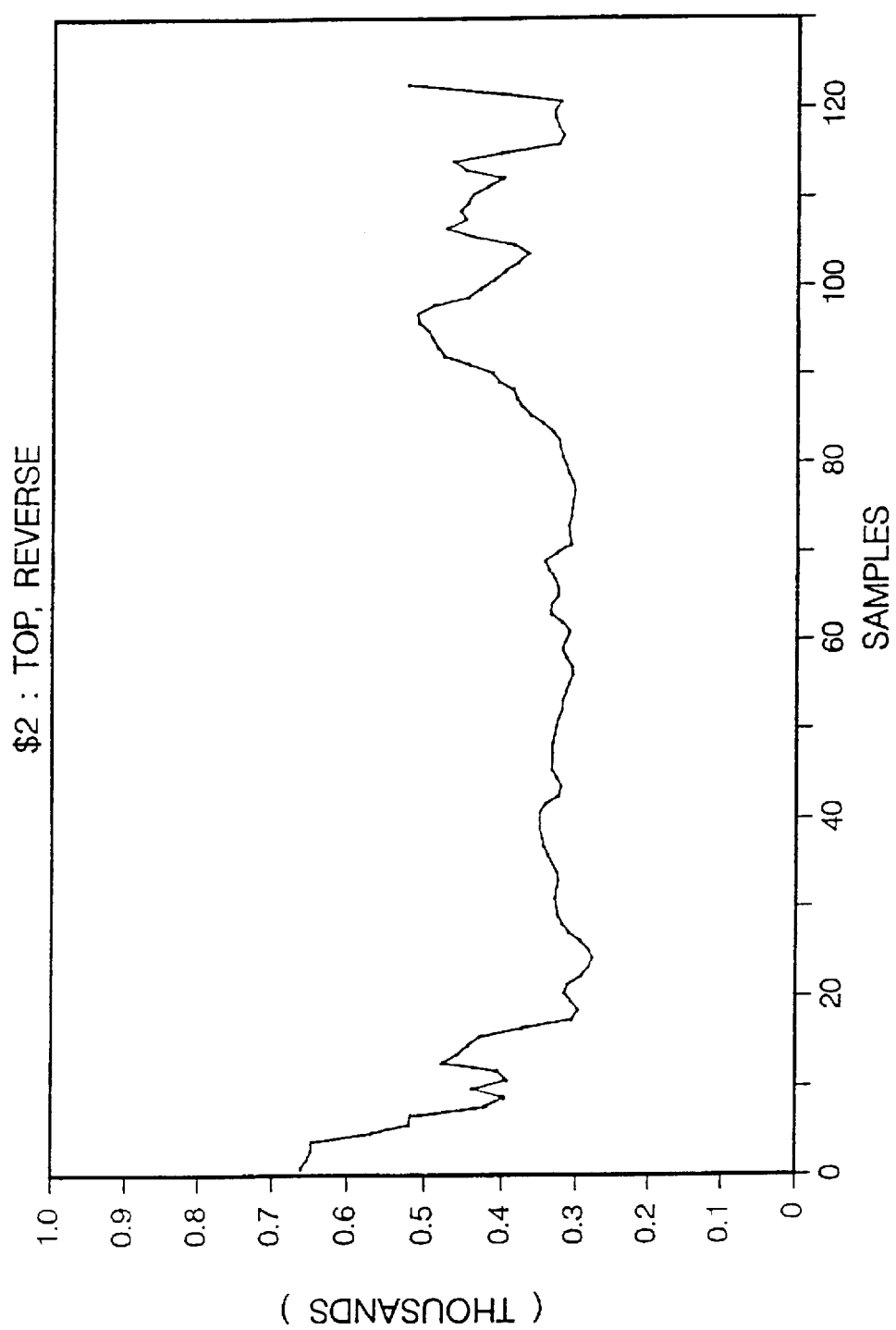
Figure 4C:
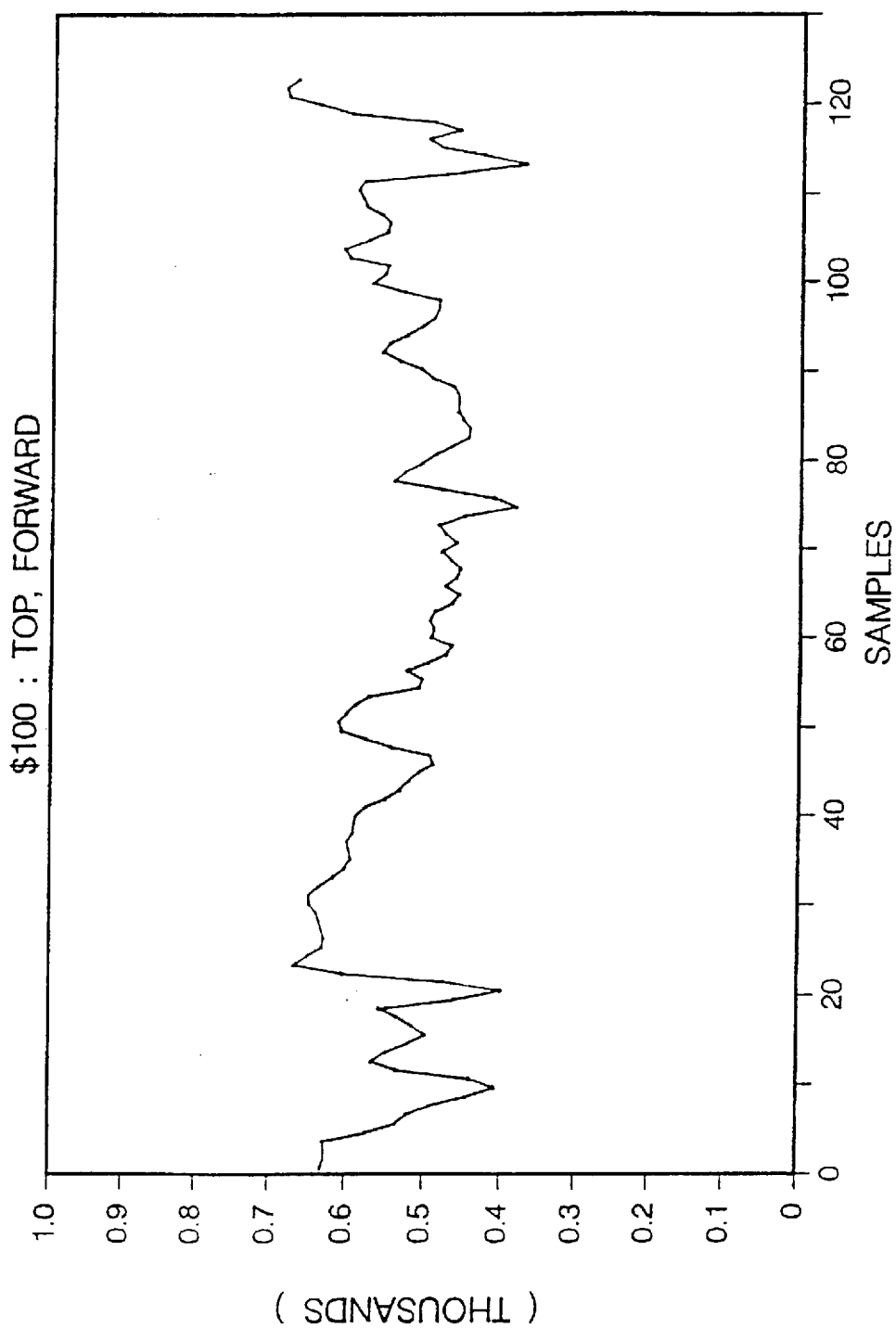

According to a first method, master patterns are generated by scanning a standard bill a plurality of times, typically three (3) times, and obtaining the average of corresponding data samples before storing the average as representing a master pattern. In other words, a master pattern for a given denomination is generated by averaging a plurality of component patterns, wherein all of the component patterns are generated by scanning a single genuine bill of "standard" quality of the given denomination. The "standard" bill is a slightly used bill, as opposed to a crisp new bill or one which has been subject to a high degree of usage. Rather, the standard bill is a bill of good to average quality. Component patterns generated according to this first methods are illustrated in FIGS. 4A–C. More specifically, FIGS. 4A–C show three test patterns generated, respectively, for the forward scanning of a $1 bill along its green side, the reverse scanning of a $2 bill on its green side, and the forward scanning of a $100 bill on its green side. It should be noted that, for purposes of clarity the test patterns in FIGS. 4A–C were generated by using 128 reflectance samples per bill scan, as opposed to the preferred use of only 64 samples. The marked difference existing among corresponding samples for these three test patterns is indicative of the high degree of confidence with which currency denominations may be called using the foregoing optical sensing and correlation procedure.

According to a second method, a master pattern for a given denomination is generated by scanning two or more standard bills of standard quality and obtaining a plurality of component patterns. These component patterns are then averaged in deriving a master pattern. For example, it has been found that some genuine $5 bills have dark stairs on the Lincoln Memorial while other genuine $5 bills have light stairs. To compensate for this variation, standard bills for which component patterns are derived may be chosen with at least one standard bill scanned having dark stairs and with at least one standard bill having light stairs.

It has been found that an alternate method can lead to improved performance in a discrimination systems, especially with regards to certain denominations. For example, it has been found that the printed indicia on a $10 bill has changed slightly with 1990 series bills incorporating security threads. More specifically, 1990 series $10 bills have a borderline-to-borderline dimension which is slightly greater than previous series $10 bills. Likewise it has been found that the scanned pattern of an old, semi-shrunken $5 bill can differ significantly from the scanned pattern of a new $5 bill.

According to a third method, a master pattern for a given denomination is generated by averaging a plurality of component patterns, wherein some of the component patterns are generated by scanning one or more new bills of the given denomination and some of the component patterns are generated by scanning one or more old bills of the given denomination. New bills are bills of good quality which have been printed in recent years and have a security thread incorporated therein (for those denominations in which security threads are placed). New bills are preferably relatively crisp. A new $10 bill is preferably a 1990 series or later bill of very high quality, meaning that the bill is in near mint condition. Old bills are bills exhibiting some shrinkage and often some discoloration. Shrinkage may result from a bill having been subjected to a relatively high degree of use. A new bill utilized in this third method is of higher quality than a standard bill of the previous methods, while an old bill in this third method is of lower quality than a standard bill.

The third method can be understood by considering Table 1 which summarizes the manner in which component patterns are generated for a variety of denominations.

TABLE 1

Component Scans by Denomination

| Denomination | Scan Direction | CP1 | CP2 | CP3 |
|---|---|---|---|---|
| $1 | Forward | −0.2 std | 0.0 std | +0.2 std |
| $1 | Reverse | −0.2 std | 0.0 std | +0.2 std |
| $2, left | Forward | −0.2 std | −0.15 std | −0.1 std |
| $2, left | Reverse | −0.2 std | −0.15 std | −0.1 std |

TABLE 1-continued

Component Scans by Denomination

| Denomination | Scan Direction | CP1 | CP2 | CP3 |
|---|---|---|---|---|
| $2, right | Forward | 0.0 std | +0.1 std | +0.2 std |
| $2, right | Reverse | 0.0 std | +0.1 std | +0.2 std |
| $5 | Forward | −0.2 old (lt str) | 0.0 new (dk str) | +0.2 old (lt str) |
| $5 | Reverse | −0.2 old (lt str) | 0.0 new (dk str) | +0.2 old (lt str) |
| $10, left | Forward | −0.2 old | −0.1 new | 0.0 old |
| $10, left | Reverse | 0.0 old | +0.1 new | +0.2 old |
| $10, right | Forward | +0.1 old | +0.2 new | +0.3 old |
| $10, right | Reverse | −0.2 old | −0.15 new | −0.1 old |
| $20 | Forward | −0.2 old | 0.0 new | +0.2 old |
| $20 | Reverse | −0.2 old | 0.0 new | +0.2 old |
| $50 | Forward | −0.2 std | 0.0 std | +0.2 std |
| $50 | Reverse | −0.2 std | 0.0 std | +0.2 std |
| $100 | Forward | −0.2 std | 0.0 std | +0.2 std |
| $100 | Reverse | −0.2 std | 0.0 std | +0.2 std |

Table 1 summarizes the position of the scanhead relative to the center of the green surface of United States currency as well as the type of bill to be scanned for generating component patterns for various denominations. The three component patterns ("CP") for a given denomination and for a given scan direction are averaged to yield a corresponding master pattern. The eighteen (18) rows correspond to the preferred method of storing eighteen (18) master patterns. The scanhead position is indicated relative to the center of the borderlined area of the bill. Thus a position of "0.0" indicates that the scanhead is centered over the center of the borderlined area of the bill. Displacements to the left of center are indicated by negative numbers, while displacements to the right are indicated by positive numbers. Thus a position of "−0.2" indicates a displacement of ²/10ths of an inch to the left of the center of a bill, while a position of "+0.1" indicates a displacement of ¹/10ths of an inch to the right of the center of a bill.

Figure 5A:
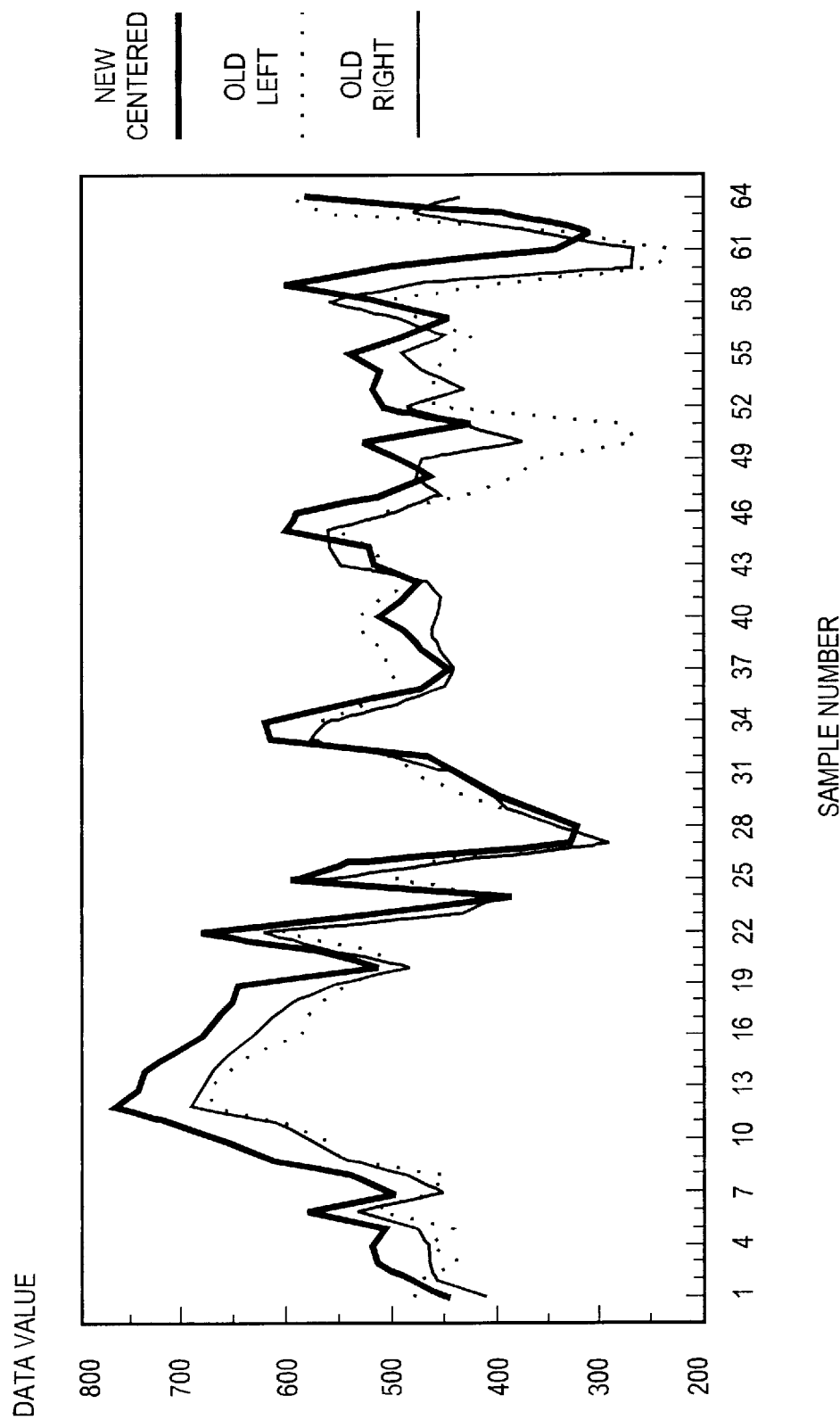
FIG. 5A is a graph illustrating component patterns generated by scanning old and new $20 bills according a second method according to a preferred embodiment of the present invention.
Figure 5B:
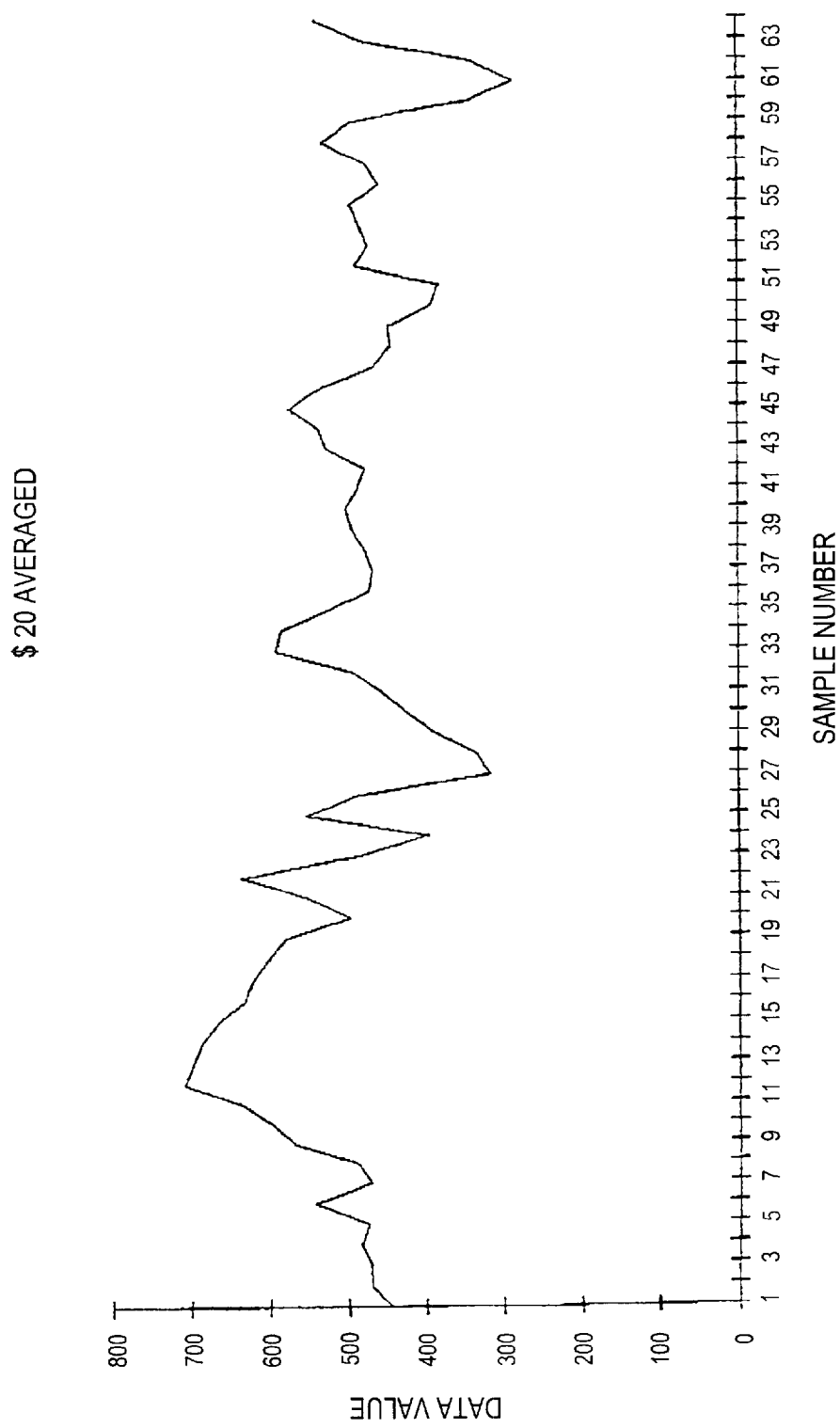
FIG. 5B is a graph illustrating an pattern for a $20 bill scanned in the forward direction derived by averaging the patterns of FIG. 5A according a second method according to a preferred embodiment of the present invention.

Accordingly, Table 1 indicates that component patterns for a $20 bill scanned in the forward direction are obtained by scanning an old $20 bill ²/10ths of a inch to the right and to the left of the center of the bill and by scanning a new $20 bill directly down the center of the bill. FIG. 5A is a graph illustrating these three patterns. These three patterns are then averaged to obtain the master pattern for a $20 bill scanned in the forward direction. FIG. 5B is a graph illustrating an pattern for a $20 bill scanned in the forward direction derived by averaging the patterns of FIG. 5A. This pattern becomes the corresponding $20 master pattern after undergoing normalization. In generating the master patterns, one may use a scanning device in which a bill to be scanned is held stationary and a scanhead is moved over the bill. Such a device permits the scanhead to be moved laterally, left and right, over a bill to be scanned and thus permits the scanhead to be positioned over the area of the bill which one wishes to scan, for example, ²/10ths of inch to the left of the center of the borderlined area.

As discussed above, for $10 bills two patterns are obtained in each scan direction with one pattern being scanned slightly to the left of the center and one pattern being scanned slightly to the right of the center. For $5 bills, it has been found that some $5 bills are printed with darker stairs ("dk str") on the picture of the Lincoln Memorial while others are printed with lighter stairs ("lt str"). The effect of this variance is averaged out by using an old bill having light stairs and a new bill having dark stairs.

As can be seen from Table 1, for some bills, the third method of using old and new bills is not used; rather, a standard ("std") bill is used for generating all three component patterns as with the first method. Thus, the master pattern for a $1 bill scanned in the forward direction is obtained by averaging three component patterns generated by scanning a standard bill three times, once 2/10ths of an inch to the left, once down the center, and once ²/10ths of an inch to the right.

As illustrated by Table 1, a discrimination system may employ a combination of the developed methods of this invention wherein, for example, some master patterns are generated according the first method and some master patterns are generated according to the third method. Likewise, a discrimination system may combine the scanning of new, standard, and old bills to generate component patterns to be averaged in obtaining a master pattern. Additionally, a discrimination system may generate master patterns by scanning bills of various qualities and/or having various characteristics and then averaging the resultant patterns. Alternatively, a discrimination system may scan multiple bills of a given quality for a given denomination, e.g., three new $50 bills, while scanning one or more bills of a different quality for a different denomination, e.g., three old and worn $1 bills, to generate component patterns to be averaged in obtaining master patterns.

While the present invention has been described with reference to one or more particular embodiments, those skilled in the art will recognize that many changes may be made thereto without departing from the spirit and scope of the present invention, which is set forth in the following claims.

We claim:

1. An improved method of generating a master pattern corresponding to a given denomination for use in a discrimination system capable of discriminating among currency bills of different denominations, comprising the steps of:

generating a plurality of component patterns for a given denomination by scanning a genuine bill of said given denomination; and generating a master pattern for said given denomination, said master pattern being derived from an average of said component patterns;

said component patterns representing and approximating analog amplitude variations in characteristic information detected from a genuine bill during scanning, said master pattern representing an average of analog variations of said characteristic information for said given denomination; said master pattern approximating the analog variations of said characteristic information.

2. An improved method of generating a master pattern corresponding to a given denomination for use in a currency evaluating device, comprising the steps of:

generating a plurality of component patterns for a given denomination by scanning a genuine bill of said given denomination; and generating a master pattern for said given denomination, said master pattern being derived from an average of said component patterns;

said component patterns representing and approximating analog amplitude variations in characteristic information detected from a genuine bill during scanning, said master pattern representing an average of analog variations of said characteristic information for said given denomination, said master pattern approximating the analog variations of said characteristic information.

3. An improved method of generating master patterns for discrimination systems capable of discriminating among currency bills of different denominations, comprising the steps of:

generating a plurality of component patterns for a plurality of denominations by scanning a genuine bill of each denomination; and generating a master pattern for each denomination, said master patterns being derived from an average of said component patterns generated for each corresponding denomination;

said component patterns representing and approximating analog amplitude variations in characteristic information detected from a genuine bill during scanning, said master pattern representing an average of analog variations of said characteristic information for said given denomination; said master pattern approximating the analog variations of said characteristic information.

4. An improved method of generating a master pattern corresponding to a given denomination for use in a discrimination system capable of discriminating among currency bills of different denominations, comprising the steps of:

generating a plurality of component patterns for a given denomination by scanning a single genuine bill of said given denomination a plurality of times; and generating a master pattern for said given denomination, said master pattern being derived from an average of said component patterns;

said component patterns representing analog variations in characteristic information detected from a genuine bill during scanning, said master pattern representing an average of analog variations of said characteristic information for said given denomination.

5. An improved method of generating a master pattern corresponding to a given denomination for use in a currency evaluating device, comprising the steps of:

generating a plurality of component patterns for a given denomination by scanning two or more genuine bills of said given denomination, wherein at least one of said component patterns is generated by scanning one of said genuine bills along a path laterally displaced from the path along which at least one other of said genuine bills is scanned in generating another of said component patterns; and generating a master pattern for said given denomination, said master pattern being derived from an average of said component patterns;

said component patterns representing analog variations in characteristic information detected by scanning genuine currency, said master pattern representing an average of analog variations of said characteristic information for said given denomination.

6. The method of claim 5 wherein said two or more genuine bills are selected to be of the same quality.

7. The method of claim 5 wherein at least two of said two or more genuine bills are selected to be of different qualities.

8. An improved method of generating a master pattern corresponding to a given denomination for use in a currency evaluating device, comprising the steps of:

generating a plurality of component patterns for a given denomination by scanning two or more genuine bills of said given denomination, wherein at least two of said two or more genuine bills are selected to be of different qualities, wherein at least one of said two or more genuine bills is selected to be an old bill and at least one of said two or more genuine bills is selected to be a new bill; and generating a master pattern for said given denomination, said master pattern being derived from an average of said component patterns;

said component patterns representing analog variations in characteristic information detected by scanning genuine currency, said master pattern representing an average of analog variations of said characteristic information for said given denomination.

9. An improved method of generating a master pattern corresponding to a given denomination for use in a discrimination system capable of discriminating among currency bills of different denominations, the master pattern being stored in a memory for subsequent comparison to a pattern generated from a bill under test, comprising the steps of:

generating a plurality of component patterns for a given denomination by scanning genuine bill currency of said given denomination; and generating a master pattern for said given denomination, said master pattern being derived from an average of said component patterns;

said component patterns representing and approximating analog amplitude variations in characteristic information detected by scanning genuine currency, each of said component patterns comprising a plurality of sample values, each sample value being proportional to the detected characteristic information, said master pattern representing an average of analog variations of said characteristic information for said given denomination; said master pattern approximating the analog variations of said characteristic information, said master pattern comprising a plurality of master sample values, each master sample value being proportional to the detected characteristic information.

10. The method of claim 9 wherein said scanning is optical scanning.

11. The method of claim 9 wherein said plurality of component patterns for a given denomination are generated by scanning a single genuine currency bill of said given denomination a plurality of times.

12. The method of claim 11 wherein said single genuine bill is selected to be of standard or average quality.

13. The method of claim 11 wherein said single genuine bill is selected to be of new quality.

14. The method of claim 9 wherein said plurality of component patterns for a given denomination are generated by scanning two or more genuine currency bills of said given denomination and wherein said two or more genuine bills are selected to be of the same quality.

15. The method of claim 14 wherein said two or more genuine bills are selected to be of standard or average quality.

16. The method of claim 14 wherein at least one of said component patterns is generated by scanning one of said genuine bills along a path laterally displaced from the path along which at least one other of said genuine bills is scanned in generating another of said component patterns.

17. The method of claim 9 wherein said plurality of component patterns for a given denomination are generated by scanning two or more genuine bills of said given denomination and wherein at least two of said two or more genuine bills are selected to be of different qualities.

18. The method of claim 17 wherein at least one of said two or more genuine bills is selected to be an old bill and at least one of said two or more genuine bills is selected to be a new bill.

19. The method of claim 17 wherein at least one of said component patterns is generated by scanning one of said genuine bills along a path laterally displaced from the path along which at least one other of said genuine bills is scanned in generating another of said component patterns.

20. The method of claim 9 wherein said plurality of component patterns for a given denomination are generated by scanning two or more genuine currency bills of said given denomination and wherein said given denomination is a five dollar denomination and wherein said two or more genuine bills are selected such that at least one of said two or more genuine bills has dark stairs on a green side and at least one of said two or more genuine bills has light stairs on a green side.

21. An improved method of generating a master pattern corresponding to a given denomination for use in a currency evaluating device, the master pattern being stored in a memory for subsequent comparison to a pattern generated from a bill under test, comprising the steps of:

generating a plurality of component patterns for a given denomination by scanning genuine currency of said given denomination; and generating a master pattern for said given denomination, said master pattern being derived from an average of said component patterns;

said component patterns representing and approximating analog variations in characteristic information detected by scanning genuine currency, each of said component patterns comprising a plurality of sample values, each sample value being proportional to the detected characteristic information, said master pattern representing an average of analog variations of said characteristic information for said given denomination; said master pattern approximating the analog variations of said characteristic information, said master pattern comprising a plurality of master sample values, each master sample value being proportional to the detected characteristic information.

22. The method of claim 21 wherein said scanning is optical scanning.

23. The method of claim 21 wherein said plurality of component patterns for a given denomination are generated by scanning a single genuine currency bill of said given denomination a plurality of times.

24. The method of claim 23 wherein said single genuine bill is selected to be of standard or average quality.

25. The method of claim 23 wherein said single genuine bill is selected to be of new quality.

26. The method of claim 21 wherein said plurality of component patterns for a given denomination are generated by scanning two or more genuine currency bills of said given denomination and wherein said two or more genuine bills are selected to be of the same quality.

27. The method of claim 26 wherein said two or more genuine bills are selected to be of standard or average quality.

28. The method of claim 26 wherein at least one of said component patterns is generated by scanning one of said genuine bills along a path laterally displaced from the path along which at least one other of said genuine bills is scanned in generating another of said component patterns.

29. The method of claim 21 wherein said plurality of component patterns for a given denomination are generated by scanning two or more genuine bills of said given denomination and wherein at least two of said two or more genuine bills are selected to be of different qualities.

30. The method of claim 29 wherein at least one of said two or more genuine bills is selected to be an old bill and at least one of said two or more genuine bills is selected to be a new bill.

31. The method of claim 29 wherein at least one of said component patterns is generated by scanning one of said genuine bills along a path laterally displaced from the path along which at least one other of said genuine bills is scanned in generating another of said component patterns.

32. The method of claim 21 wherein said plurality of component patterns for a given denomination are generated by scanning two or more genuine currency bills of said given denomination and wherein said given denomination is a five dollar denomination and wherein said two or more genuine bills are selected such that at least one of said two or more genuine bills has dark stairs on a green side and at least one of said two or more genuine bills has light stairs on a green side.

33. An improved method of generating master patterns for discrimination systems capable of discriminating among currency bills of different denominations, the master patterns being stored in a memory for subsequent comparison to a pattern generated from a bill under test, comprising the steps of:

generating a plurality of component patterns for a plurality of denominations by scanning genuine currency of each denomination; and generating a master pattern for each denomination, said master patterns being derived from an average of said component patterns generated for each corresponding denomination;

said component patterns representing and approximating analog variations in characteristic information detected by scanning genuine currency, said master pattern representing an average of analog variations of said characteristic information for said given denomination; said master pattern approximating the analog variations of said characteristic information, said component and master patterns comprising signal samples proportional to characteristic information.

34. The method of claim 33 wherein said scanning is optical scanning.

35. The method of claim 33 wherein said plurality of component patterns for a given denomination are generated by scanning a single genuine currency bill of said given denomination a plurality of times.

36. The method of claim 33 wherein said plurality of component patterns for a given denomination are generated by scanning two or more genuine bills of said given denomination and wherein at least one of said two or more genuine bills is selected to be an old bill and at least one of said two or more genuine bills is selected to be a new bill.

37. The method of claim 33 wherein said plurality of component patterns for a given denomination are generated by scanning two or more genuine bills of said given denomination and wherein at least one of said component patterns is generated by scanning one of said genuine bills along a path laterally displaced from the path along which at least one other of said genuine bills is scanned in generating another of said component patterns.

38. An improved method for discriminating among currency bills of different denominations, comprising the steps of:

illuminating a predetermined section of a currency bill by focusing at least one strip of light thereupon;

detecting the light reflected off said illuminated section of said bill to generate an analog reflectance signal;

generating relative displacement between said strip of light and said currency bill so as to illuminate or optically scan successive sections of said bill along a predetermined dimension thereof;

obtaining a series of analog reflectance signals corresponding to light reflected from each of said successive bill sections using said strip of light;

digitizing and processing said series of analog reflectance signals to yield a set of digital data samples which, in combination, represent a data pattern characteristic of the currency denomination of said bill;

generating and storing a set of master characteristic patterns corresponding to optical scanning of genuine bills of each of the different currency denominations to be discriminated, said master patterns corresponding to said different denominations being derived from an average of a plurality of component patterns for each of said different denominations, said component patterns for a given denomination being derived by scanning genuine currency corresponding to said given denomination, said component patterns representing and approximating analog variations in characteristic information detected by scanning genuine currency, each of said master patterns representing an average of analog variations of said characteristic information for said given denomination; each of said master patterns approximating the analog variations of said characteristic information, said component and master patterns comprising signal samples proportional to characteristic information; and comparing the characteristic pattern for a scanned currency bill to each of said stored master patterns to determine the degree of correlation therebetween and thereby to identify the denomination of said currency bill.

39. The method of claim 38 wherein said plurality of component patterns for a given denomination are generated by scanning a single genuine currency bill of said given denomination a plurality of times.

40. The method of claim 38 wherein said plurality of component patterns for a given denomination are generated by scanning two or more genuine currency bills of said given denomination and wherein at least one of said two or more genuine bills is selected to be an old bill and at least one of said two or more genuine bills is selected to be a new bill.

41. The method of claim 38 wherein said plurality of component patterns for a given denomination are generated by scanning two or more genuine currency bills of said given denomination and wherein at least one of said component patterns is generated by scanning one of said genuine bills along a path laterally displaced from the path along which at least one other of said genuine bills is scanned in generating another of said component patterns.

42. A currency discriminating device comprising:

a light source for illuminating a strip of a preselected segment of a scanned bill;

a detector for detecting characteristic information from said scanned bill, said characteristic information being the intensity of light reflected from said scanned bill, said detector receiving reflected light from the illuminated strip on said scanned bill and producing a scanned signal representing variations in the intensity of the reflected light;

means for sampling said scanned signal at preselected intervals, each of said scanned signal samples being proportional to the intensity of the light reflected from a different strip of said preselected segment of said scanned bill;

a memory for storing at least one master pattern of stored intensity signal samples for each of a plurality of denominations of genuine bills, each of said stored intensity signal samples being proportional to the intensity of the light reflected from a different strip of said preselected segment of a genuine bill of a given denomination; and a signal processing means for
(1) receiving said scanned signal samples;
(2) generating a scanned pattern from said scanned signal samples
(3) comparing at least a portion of said scanned pattern with at least a portion of at least one of said master patterns of stored intensity signal samples; and
(4) indicating the denomination of said scanned bill or an error based on said comparison;

wherein said master patterns corresponding to said plurality of denominations are derived from an average of a plurality of component patterns for each of said plurality of denominations, said component patterns for a given denomination being derived by scanning genuine currency corresponding to said given denomination.

43. An improved method of generating a master pattern corresponding to a given denomination for use in a discrimination system capable of discriminating among currency bills of different denominations, comprising the steps of:

generating a plurality of component patterns for a given denomination by scanning genuine currency of said given denomination along a given segment with an analog scanner, said analog scanner generating a signal proportional to characteristic information detected from a genuine bill along said segment for each genuine bill scanned, said signal being sampled at preselected intervals as said genuine bill and scanner are moved relative to each other, each of said samples being proportional to the detected characteristic information for a given portion of said segment; and generating a master pattern for said given denomination, said master pattern being derived from an average of said component patterns, said master pattern comprising average samples, each of said average samples being an average of samples that are proportional to characteristic information along said segment;

wherein said plurality of component patterns for a given denomination are generated by scanning two or more genuine bills of said denomination and wherein said two or more genuine bills are selected to be of the same quality.

44. The method of claim 43 wherein said two or more genuine bills are selected to be of standard or average quality.

45. The method of claim 43 wherein at least one of said component patterns is generated by scanning one of said genuine bills along a path laterally displaced from the path along which at least one other of said genuine bills is scanned in generating another of said component patterns.

46. An improved method of generating a master pattern corresponding to a given denomination for use in a discrimination system capable of discriminating among currency bills of different denominations comprising the steps of:

generating a plurality of component patterns for a given denomination by scanning genuine currency of said given denomination along a given segment with an analog scanner said analog scanner generating a signal proportional to characteristic information detected from a genuine bill along said segment for each genuine bill scanned, said signal being sampled at preselected intervals as said genuine bill and scanner are moved relative to each other, each of said samples being proportional to the detected characteristic information for a given portion of said segment; and generating a master pattern for said given denomination said master pattern being derived from an average of said component patterns, said master pattern comprising average samples, each of said average samples being an average of samples that are proportional to characteristic information along said segment;

wherein said plurality of component patterns for a given denomination are generated by scanning two or more genuine bills of said given denomination and wherein at least two of said two or more genuine bills are selected to be of different qualities.

47. The method of claim 46 wherein at least one of said two or more genuine bills is selected to be an old bill and at least one of said two or more genuine bills is selected to be a new bill.

48. The method of claim 46 wherein at least one of said component patterns is generated by scanning one of said genuine bills along a path laterally displaced from the path along which at least on other of said genuine bills is scanned in generating another of said component patterns.

49. An improved method of generating a master pattern corresponding to a given denomination for use in a discrimination system capable of discriminating among currency bills of different denominations, comprising the steps of:

generating a plurality of component patterns for a given denomination by scanning genuine currency of said given denomination along a given segment with an analog scanner, said analog scanner generating a signal proportional to characteristic information detected from a genuine bill along said segment for each genuine bill scanned, said signal being sampled at preselected intervals as said genuine bill and scanner are moved relative to each other, each of said samples being proportional to the detected characteristic information for a given portion of said segment: and generating a master pattern for said given denomination, said master pattern being derived from an average of said component patterns, said master pattern comprising average samples, each of said average samples being an average of samples that are proportional to characteristic information along said segment;

wherein said plurality of component patterns for a given denomination are generated by scanning two or more genuine bills of said given denomination and wherein said given denomination is a five dollar denomination and wherein said two or more genuine bills are selected such that at least one of said two or more genuine bills has dark stairs on a green side and at least one of said two or more genuine bills has light stairs on a green side.

* * * * *